US006846099B2

United States Patent
Dubin et al.

(10) Patent No.: US 6,846,099 B2
(45) Date of Patent: Jan. 25, 2005

(54) AIRCRAFT POSITION LIGHT

(75) Inventors: Matthew B. Dubin, Scottsdale, AZ (US); Brent D. Larson, Cave Creek, AZ (US); Scott R. Mangum, Dublin, OH (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/886,548

(22) Filed: Jun. 21, 2001

(65) Prior Publication Data

US 2002/0196637 A1 Dec. 26, 2002

(51) Int. Cl.[7] .............................. B64D 47/02; F21V 5/02
(52) U.S. Cl. ...................... 362/470; 362/231; 362/245; 362/295; 362/309; 362/327; 362/522
(58) Field of Search ................................ 359/389, 831, 359/833; 362/31, 230, 231, 243–247, 294, 295, 307–309, 327–329, 339, 470–472, 520–522, 555, 558, 800, 280, 281, 373

(56) References Cited

U.S. PATENT DOCUMENTS

| | | | | |
|---|---|---|---|---|
| 1,617,423 A | * | 2/1927 | Seitz | 362/327 |
| 1,637,348 A | * | 8/1927 | Ott | 359/833 |
| 1,947,043 A | * | 2/1934 | Gordon | 362/247 |
| 4,161,770 A | | 7/1979 | Maurer | 362/309 |
| 4,367,514 A | * | 1/1983 | Large et al. | 362/470 |
| 4,714,983 A | * | 12/1987 | Lang | 362/31 |
| 4,737,896 A | * | 4/1988 | Mochizuki et al. | 362/339 |
| 4,852,985 A | * | 8/1989 | Fujihara et al. | 359/389 |
| 4,915,478 A | * | 4/1990 | Lenko et al. | 349/65 |
| 5,165,080 A | | 11/1992 | Healey | 359/636 |
| 5,211,463 A | * | 5/1993 | Kalmanash | 362/231 |
| 5,241,462 A | * | 8/1993 | Sugimoto | 362/339 |
| 5,325,271 A | | 6/1994 | Hutchisson | 362/555 |
| 5,349,504 A | * | 9/1994 | Simms et al. | 362/555 |
| 5,450,301 A | * | 9/1995 | Waltz et al. | 362/231 |
| 5,528,474 A | * | 6/1996 | Roney et al. | 362/294 |
| 5,704,703 A | * | 1/1998 | Yamada et al. | 362/339 |
| 5,745,176 A | | 4/1998 | Lebens | 348/370 |
| 5,769,532 A | * | 6/1998 | Sasaki | 362/307 |
| 5,793,164 A | | 8/1998 | Authier | 315/300 |
| 5,803,579 A | | 9/1998 | Turnbull et al. | 362/83.1 |
| 6,008,871 A | | 12/1999 | Okumura | 349/61 |
| 6,011,493 A | | 1/2000 | Bushell et al. | 340/981 |
| 6,132,072 A | | 10/2000 | Turnbull et al. | 362/494 |
| 6,139,166 A | | 10/2000 | Marshall et al. | 362/231 |
| 6,177,761 B1 | * | 1/2001 | Pelka et al. | 362/339 |
| 6,203,180 B1 | | 3/2001 | Fleischmann | 362/471 |
| 6,268,702 B1 | | 7/2001 | Fleck | 315/185 R |
| 6,278,382 B1 | | 8/2001 | DeMarco et al. | 340/981 |
| 6,419,372 B1 | * | 7/2002 | Shaw et al. | 362/231 |
| 6,535,337 B1 | | 3/2003 | Tanaka et al. | 359/599 |
| 6,590,711 B1 | | 7/2003 | Gardner et al. | 359/599 |
| 6,626,545 B2 | | 9/2003 | Gardner et al. | 359/606 |
| 6,628,369 B2 | | 9/2003 | Kumagai et al. | 349/194 |
| 6,643,067 B2 | | 11/2003 | Miyamae et al. | 359/619 |

FOREIGN PATENT DOCUMENTS

WO    WO 00/71417 A1    11/2000

OTHER PUBLICATIONS

Hella Aerospace GmbH brochure, "LED Reading Lights" ca. 2000–2001.

* cited by examiner

Primary Examiner—Alan Cariaso
(74) Attorney, Agent, or Firm—Larry J. Palguta

(57) ABSTRACT

A position light (200) for use on an aircraft. The aircraft position light uses light sources (302) installed into an alignment fixture (304) which optionally carries away heat generated by the light sources. Light emitted by the light sources is directed into a first prism (308), which distributes and directs the light. A second prism (324) is used to further shape the pattern of the light. A lens (206) is installed over the position light (200) to protect it from the elements.

40 Claims, 7 Drawing Sheets

AIRCRAFT POSITION LIGHT

BACKGROUND OF THE INVENTION

1. Field of the Invention

This invention relates to an aircraft position light. Specifically, the invention is directed to a position light that uses light sources and a prismatic optic array.

2. Description of the Related Art

Aircraft operating at night utilize a variety of lights to attract the attention of other aircraft operating in the same airspace, in order to prevent collisions between aircraft. One such lighting system is the position lighting system.

A position lighting system comprises a red light installed on the port wing, a green light installed on the starboard wing, and one or more white lights installed at a rearward-facing position on the aircraft. Other aircraft operating in the vicinity of the lighted aircraft can discern the relative position of the lighted aircraft and its direction of travel by the color of the observed position lights and their movement, allowing the other aircraft to take evasive action as needed to avoid a collision.

Position lights have previously been installed on aircraft for this purpose, but they suffer from several disadvantages. Prior position lights use incandescent lamps, which have a limited life. This limited life is further reduced by the harsh aircraft operating environment. Because aviation safety regulations require functioning position lights when operating at night, failure of the position lights can result in delayed flight departures in addition to the high maintenance costs associated with frequent lamp replacement. Some improvements in aircraft lamp life have been made by the use of at least one light emitting diode (LED), such as the aeroplane cabin lighting arrangement described in Fleischmann U.S. Pat. No. 6,203,180. However, position lights require additional considerations, as will be discussed below.

Another disadvantage with the use of incandescent lamps in the design of position lights is the difficulty encountered in designing small and efficient optical systems that provide sufficient illumination in both the horizontal and vertical planes relative to the position light, while properly limiting light distribution. Such light limiting, known as "angular cutoff," is necessary to prevent excess overlap between the position lights on the aircraft so that other aircraft operating in the same airspace can accurately discern the lighted aircraft's individual position lights, assisting in determination of its relative position.

It is known that prisms may be used to direct and diffuse light. For example, in Hutchisson U.S. Pat. No. 5,325,271, a marker lamp having LEDs and a prismatic diffuser is disclosed. However, this system utilizes openings in the input facets of the prism to mount the LEDs into the prism. This configuration does not permit the arrangement of LEDs into a single plane, which would reduce complexity and cost. Further, this system is concerned with the diffusion of light and does not teach how to produce an asymmetric lighting pattern having a sharp cutoff, as is needed for aircraft position lights. In Maurer U.S. Pat. No. 4,161,770, a prism is disclosed for a guide signal device. Light emitted from the source undergoes total internal reflection before emerging at one of the surfaces of the prism. The prism thus permits the guide light to be of low-profile construction, yet visible at a distance. However, the system disclosed by Maurer does not teach how to utilize both direct light emission and total internal reflection to produce the necessary sharp angular cutoff and the asymmetric lighting pattern needed for aircraft position lights.

To compensate for their drawbacks, prior position lights utilize multiple incandescent lamps to offset the short lamp life, and complex reflector arrangements to achieve the required light distribution. There is a need for a position light which provides the necessary light distribution and long operating life in the harsh aircraft environment.

SUMMARY OF THE INVENTION

This invention is directed to a position light that provides the necessary light distribution and operating life without resorting to a multitude of incandescent lamps and complex reflector arrangements. The present invention is designed for use on an aircraft.

Specifically, the present invention includes one or more light sources, preferably solid state light sources such as light emitting diodes. The light sources emit the color desired for a particular position light, or for compatibility with an optional optical filter and/or diffuser. In an array configuration, the light sources can provide beneficial attributes such as inherent redundancy and scalability of position light size and brightness. A further advantage of an array configuration is that all of the light sources may optionally be located in one plane and oriented in a uniform direction, simplifying position light design and assembly.

It is not necessary for all of the light sources in an array to have identical characteristics. This allows combinations of light sources having differing wavelengths of light emission to be used. Further, by controlling the ratio or brightness of differing types of light sources, it is possible to tailor the spectral output of the light emitted by the position light. It is also possible to construct a position light capable of emitting several distinct colors. For example, a position light that contains both red and green light sources could be placed on either wingtip, with the proper color being selected by energizing the appropriate set of light sources.

The angular distribution of the emitted light can vary between differing types of light sources as well. Some light sources may emit a narrow beamspread of light, while other light sources may emit a broad beamspread of light. This characteristic may be used to advantage in tailoring the output of the position light. For example, some configurations of the position light may rely on the use of a light source having a specific angular distribution. Other configurations of the position light may utilize a combination of light sources having differing angular distributions of light to achieve a desired light output.

Light from the light sources is directed toward an input face of a primary prism. An optical filter may optionally be interposed between the light sources and the input face of the primary prism to tailor the chromaticity of the light emitted by the position light. The optical filter may be frequency selective, such as for night-vision infrared lighting. The optical filter may also tailor the color of the light sources to meet a desired chromaticity. The optical filter may further be electronically tunable by conventional means, if desired.

A diffuser may also be optionally interposed between the light sources and the input face of the primary prism, with or without the optical filter. The diffuser may optionally be placed between the light sources and the optical filter, or between the optical filter and the input face of the primary prism; alternatively, a plurality of diffusers may be located between the light sources and the optical filter, and also between the optical filter and the input face of the primary prism.

Light reflected from a transmissive-reflective ("transflective") face of the primary prism is directed by an output face of the primary prism in the direction of flight of the aircraft when the aircraft position light is mounted as a wingtip light. This arrangement utilizes total internal reflection to provide a sharp angular cutoff of the light where it is needed to meet regulatory requirements for aircraft lighting. It is otherwise difficult to obtain such a cutoff of light without sacrificing efficiency or compactness of the position light's optical system. When mounted as a rear position light, the light emitted from the output face of the primary prism is aimed in a direction opposite that of the aircraft's direction of flight. A portion of the distributed light within the primary prism is emitted from the transflective face of the primary prism. A secondary prism may optionally be placed in proximity to the transflective face of the primary prism to further focus and direct the light to achieve the desired light intensities in the vertical and horizontal planes relative to the position light, while minimizing overlap with light emitted by other position lights on the aircraft. The secondary prism may include an input face, a transflective face, and an output face. The faces of the primary prism and the secondary prism may optionally include a multitude of facets to aid distribution of the light within the prisms. The facets may be flat or curved in shape. The resulting optical system is small, has a sharp light emission cutoff, and has high efficiency. This is accomplished by using total internal reflection and by using both the reflected and transmitted light.

The entire system of light sources and directing optics is assembled into a housing that affords protection from the elements. The housing may include a clear window or lens to allow emission of the light. The window or lens may optionally be colored to further tailor the chromaticity of the emitted light.

An advantage of the primary and secondary prisms is that their optical characteristics are independent of variations in the light sources. As a result, the shape of the position light's light-distribution pattern will not change if one or more of the light sources in an array should fail or dim. This characteristic can be used to further advantage by operating the light sources at less than their maximum rated power level, extending the operating life of the light.

Another advantage of the prisms is their scalability. The position light may be made brighter or dimmer by increasing or decreasing the number of light sources. However, the shape of the position light's lighting pattern will not change with changes in the number of light sources, allowing the geometries and arrangements of the optical elements to be fixed for a desired lighting pattern. The scalable nature of the prisms also allows the thickness of the prisms to be altered as needed to match the desired array pattern and/or number of light sources, without a need to alter the geometries or arrangements of the optical elements. This scalability feature thus allows the optical design of the position light to be optimized and then fixed, while at the same time easily permitting mechanical changes to the position light in order to accommodate variations between models of aircraft.

Solid state light sources offer capabilities not available with prior position lights. For example, the intensity of the lights can be varied without the time lag associated with prior incandescent lamps. The light intensity output of the solid state light sources responds nearly instantaneously to changes in drive current, allowing amplitude modulation of the position light's intensity for the purpose of transmitting data. If the modulation rate is high enough, information can be transmitted via the position lights without visual perception of the light intensity changes incident to modulation.

Accordingly, it is an object of this invention to provide a position light for use on an aircraft that provides long operating life, the necessary light intensities, and minimal light overlap interference with other position lights on the aircraft, without the need for complex optical assemblies. The invention overcomes the drawbacks of prior position lights through the use of light sources, one or more total internal reflection prisms, and a prismatic light-directing array. It is a further object of this invention to provide a low cost, modular optical system wherein a single optical assembly accommodates multiple configurations of light sources without the need for coatings or mirrored surfaces.

The present invention comprises a position light for use on an aircraft, comprising: a housing structure; one or more light sources arranged inside said housing structure; a prism having an input face, an output face, and a transflective face to receive, distribute, and direct light emitted by said light sources; and a lens through which emitted light passes.

These and other features will become better understood with reference to the following description, appended claims, and accompanying drawings.

DETAILED DESCRIPTION OF THE INVENTION

Figure 1:
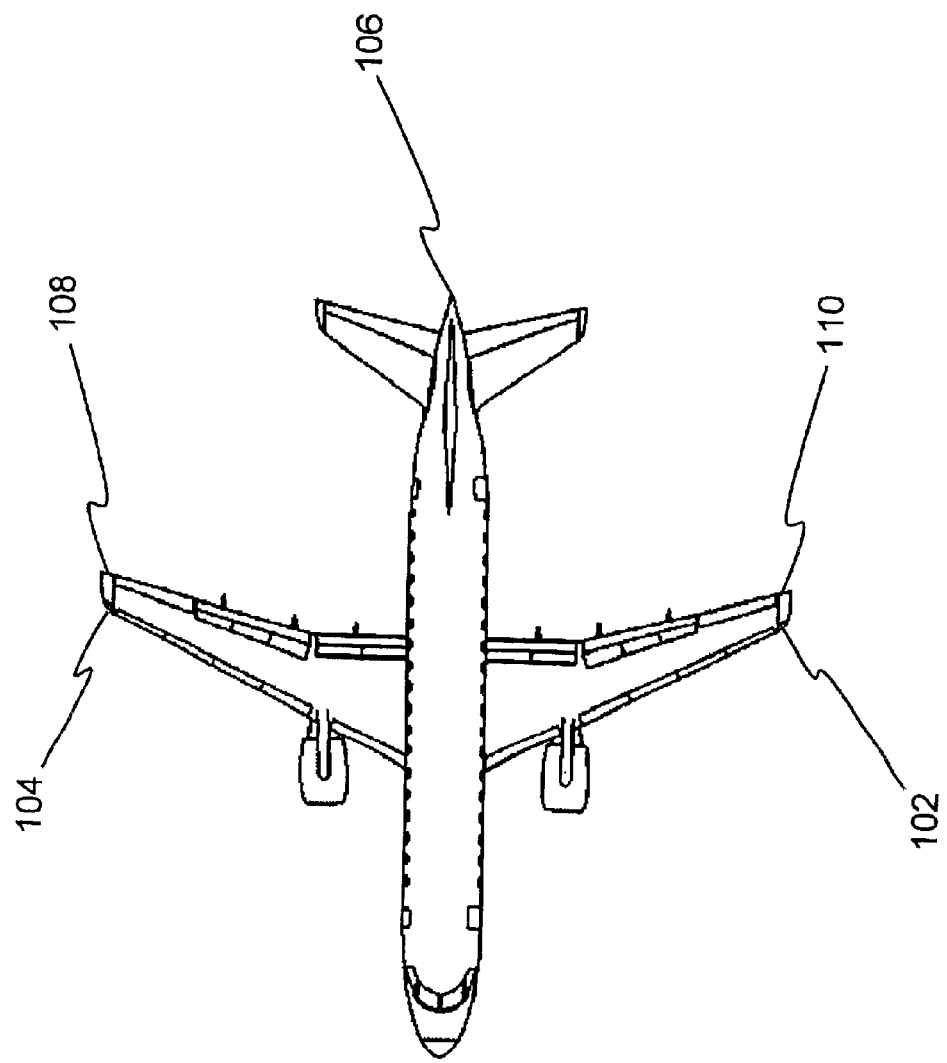
FIG. 1 is a top view of the position lights installed on a typical aircraft.

The position lights are installed on an aircraft as generally shown in FIG. 1. A red position light 102 is installed on the forward portion of the port wing tip. A green light 104 is installed on the forward portion of the starboard wing tip, and a white rear position light 106 is installed on the tail of the aircraft in a position such that its radiant output is directed toward the rear of the aircraft. As an alternative to rear position light 106, rearward facing lights 108 and 110 may be installed on the starboard and port wings respectively.

Figure 2:
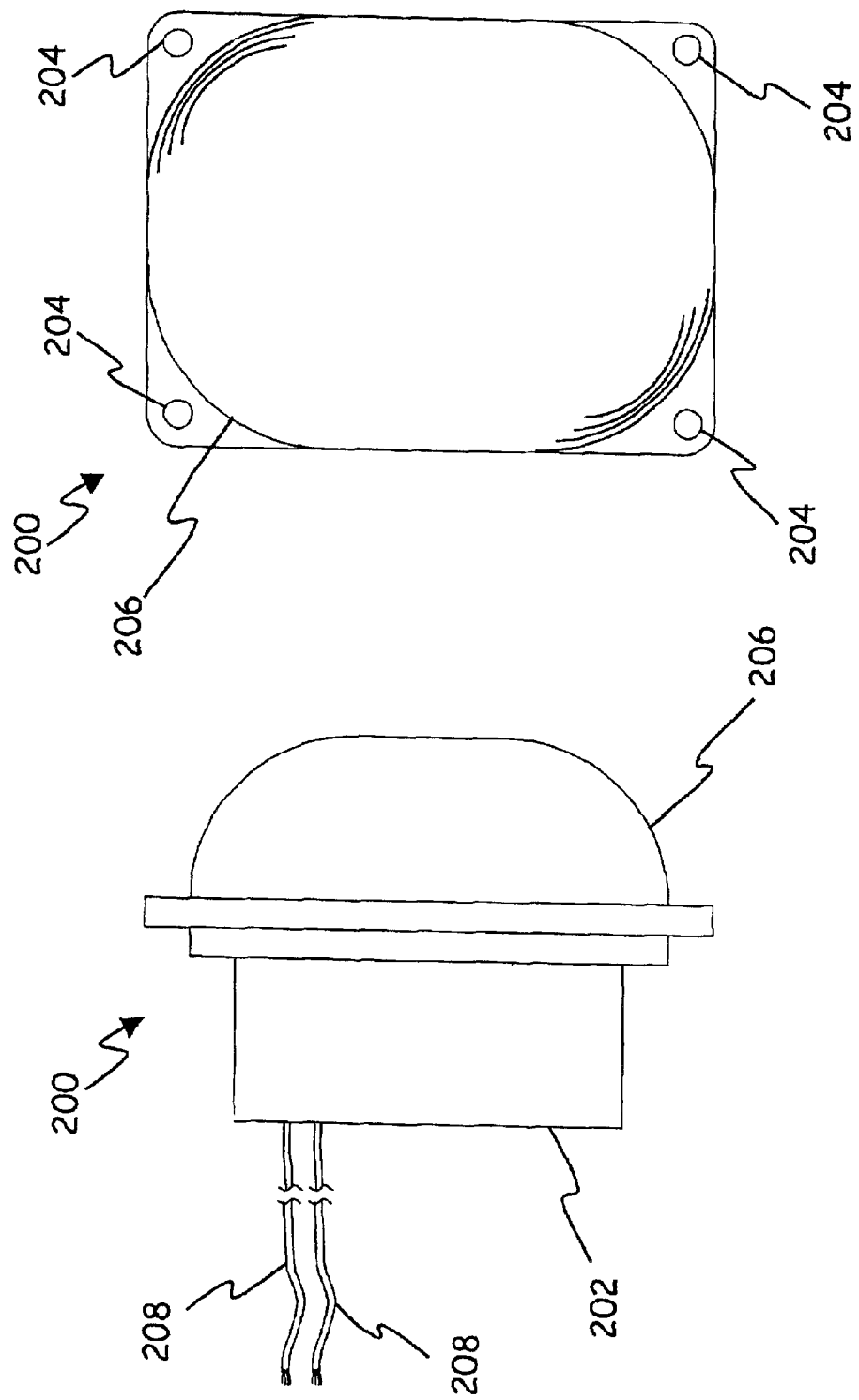
FIG. 2 is a general view of the position light.

As illustrated by FIG. 2, a position light 200 may be arranged in a housing structure 202 with mounting means 204. The shape of the housing structure 202 and mounting means 204 are not critical and may be varied as needed for proper fit on a given aircraft. In the preferred embodiment, housing structure 202 and mounting means 204 are compatible with the shape of prior position lights to facilitate easy replacement of the prior position lights with the position light 200. A lens 206 is installed onto the housing structure 202 for protection from the elements. Power to position light 200 is supplied from the aircraft's electrical system by electrical wiring 208.

Figure 3:
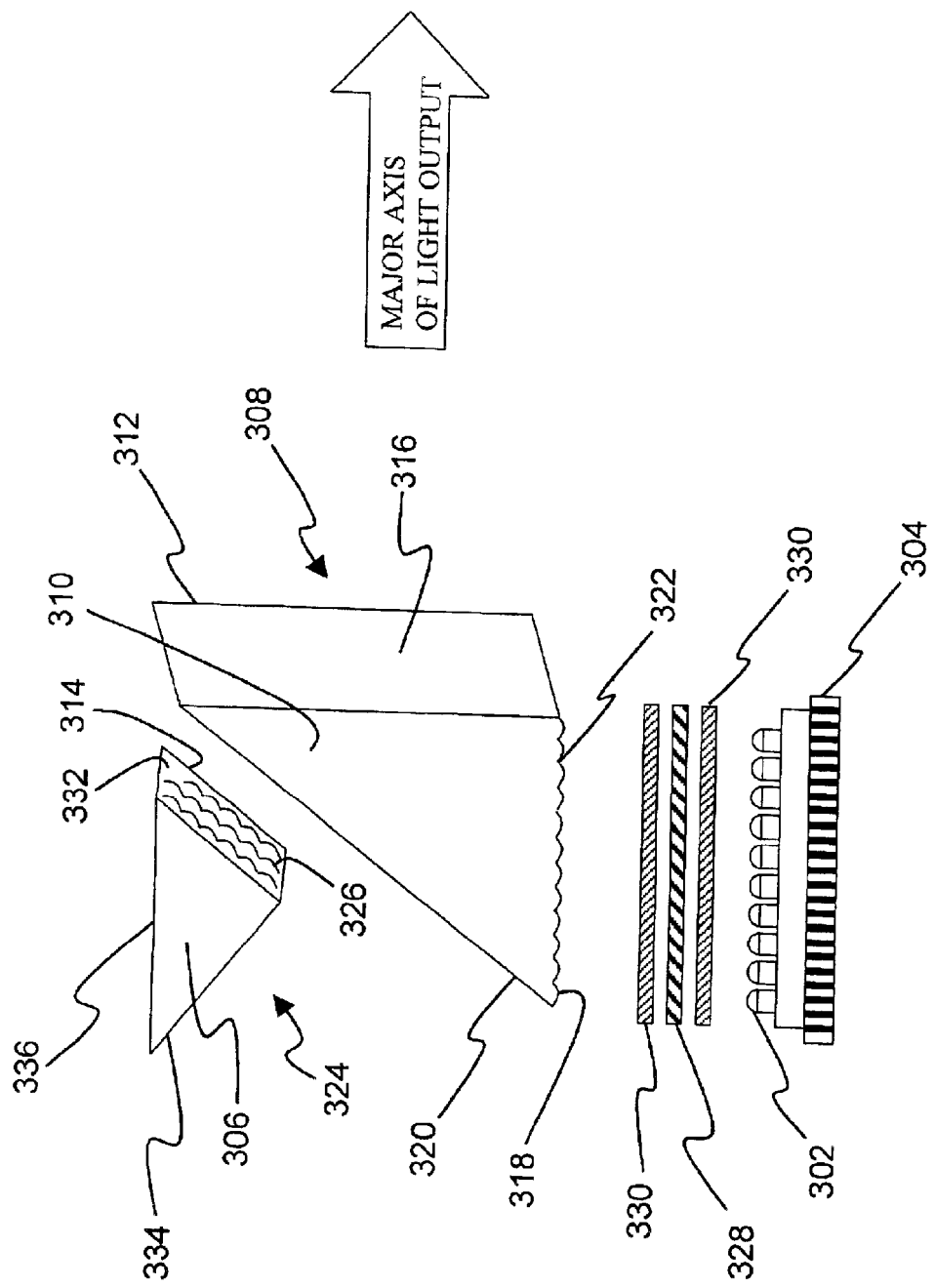
FIG. 3 is a schematic diagram of the position light optics.

As shown generally by FIG. 3, the position light 200 can include one or more light sources 302 optionally placed into an alignment guide 304. The alignment guide 304 directs the light sources 302 toward a primary prism 308. Alignment guide 304 may also function as a heat sink to remove heat generated by the light sources 302. The light sources 302 may be arranged in a square, rectangular, hexagonal, or other preferred array pattern. Light sources 302 may be directed at a uniform angle with respect to alignment guide 304.

Alternatively, the light sources 302 may be directed at varying angles in order to set up a complex light pattern within primary prism 308 for improved distribution of light within primary prism 308.

An optical filter 328 may optionally be interposed between light sources 302 and input face 318 of primary prism 308. Optical filter 328 may be frequency selective, such as for night-vision infrared lighting. Optical filter 328 may also tailor the color of light sources 302 to meet a desired chromaticity for position light 200. Optical filter 328 may further be electronically shutter-controlled, if desired. A diffuser 330 may also be optionally interposed between light sources 302 and input face 318 of primary prism 308, with or without optical filter 328. Diffuser 330 may optionally be placed between light sources 302 and optical filter 328, or between optical filter 328 and input face 318 of primary prism 308; alternatively, a plurality of diffusers 330 may be located between light sources 302 and optical filter 328, and also between optical filter 328 and the input face 318 of primary prism 308.

The preferred embodiment of primary prism 308 is shaped generally as a right triangle with coplanar top and bottom surfaces 310 and 312 respectively, an input face 318, an output face 316, and a transflective face 320. Primary prism 308 is oriented such that the output face 316 is directed toward the aircraft's direction of flight when installed on the aircraft as a wingtip position light. When installed as a rear position light, primary prism 308 is arranged such that its sharp angular cutoff matches the desired distribution for rear position lighting. The top surface 310 and bottom surface 312 of primary prism 308 are oriented generally parallel to the plane formed by the aircraft's wings. Top surface 310 may be tilted with respect to bottom surface 312 in order to tailor the vertical distribution of light emitted by position light 200. Top surface 310 and bottom surface 312 may also be textured to further tailor the vertical distribution of the light emitted by position light 200. Input face 318 is oriented generally in parallel with the aircraft's direction of flight and receives light from the light sources 302. Light emitted from light sources 302 form a continuum of incident angles of light on transflective face 320 such that some light exceeds the critical angle of total internal reflection for primary prism 308, some light is at the critical angle of primary prism 308, and some light does not exceed the critical angle of primary prism 308.

The geometry of primary prism 308 is selected such that some of the light incident on transflective face 320 exceeds the critical angle of total internal reflection for primary prism 308. It should be noted that the geometry of primary prism 308 may be shaped as needed to achieve the desired light distribution and is not restricted to the geometry of a triangle. Further, the faces of the prism may be curved, if desired. The light that exceeds the critical angle of total internal reflection for primary prism 308 will be directed towards output face 316. Some of the light will not exceed the critical angle and will reflect according to Fresnel's equations for reflection. The remaining light will be transmitted and refracted through transflective face 320. Because total internal reflection is angle independent beyond the critical angle, and Fresnel reflections drop off rapidly as the incidence angle is decreased from the critical angle, the intensity of the light emitted through output face 316 will have a sharp angular cutoff. The light emitted by transflective face 320 provides the desired intensity distribution of position light 200 in areas not covered by the reflected light transmitted by output face 316.

Light emitted by the light sources 302 is directed to the input face 318 of primary prism 308. The input face 318 may include a multitude of facets 322 to build up a complex light intensity pattern to further distribute the light within the primary prism 308. The facets 322 may be either flat or curved in shape. Further, the facets 322 may be located on any or all faces of primary prism 308. For optimum performance, light sources 302 may be positioned such that the rows of light sources 302 are not aligned with facets 322. The majority of the light directed into primary prism 308 preferably exits the output face 316. This is due to the fact that some of the distributed light that strikes transflective face 320 will have an angle of incidence greater than the critical angle and will undergo total internal reflection, causing the light to exit through output face 316. While some of the light within primary prism 308 will undergo Fresnel reflections, the amount of reflected light will fall off rapidly with angles relative to transflective face 320, contributing to the angular cutoff of light necessary to minimize overlap between position lights on the aircraft. The angular cutoff is defined by the geometry of primary prism 308 and light sources 302.

A portion of the distributed light within primary prism 308 exits through the transflective face 320. This light is directed aft of the light emitted by output face 316; its distribution may be further shaped by secondary optics such as a lens array, but preferably by a prism such as secondary prism 324. Secondary prism 324 may include a top surface 306, a bottom surface 314, an input face 332, an output face 334, and a transflective face 336 in the same manner as previously described for primary prism 308. The size, shape, and position of secondary prism 324 relative to primary prism 308 is dependent upon the amount of light that is to be redirected as it exits the transflective face 320 of primary prism 308. Light emitted from transflective face 320 of primary prism 308 enters input face 332 of secondary prism 324. Light emitted from transflective face 320 of primary prism 308 may also enter output face 334 of secondary prism 324. Light exits secondary prism 324 from output face 334 and transflective face 336 in the same manner as previously described for primary prism 308, providing the necessary light distribution. The light distribution effected by secondary prism 324 may be further tailored by optionally adding facets 326 to secondary prism 324. The facets 326 may be either flat or curved in shape. Further, the facets 326 may be located on any or all faces of secondary prism 324.

Figure 4:
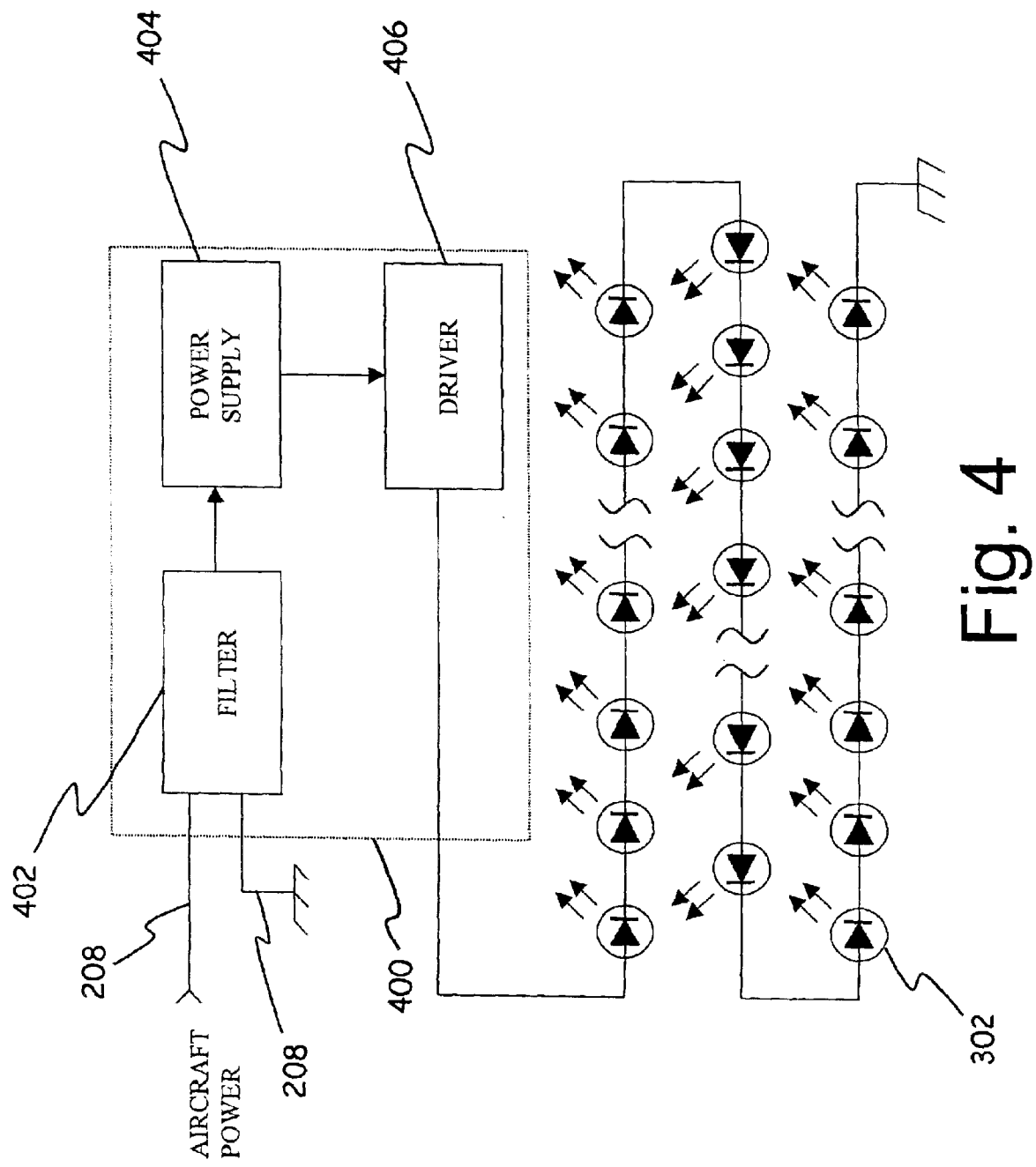
FIGS. 4, 5, and 6 are electrical schematics of the position light.

As shown by FIG. 4, electrical power from the aircraft is supplied to a control circuit 400 by electrical wiring 208. Control circuit 400 may be located inside housing structure 202, or may be located remotely. A high-voltage protection filter 402 isolates electrical noise between the aircraft and control circuit 400. A power supply 404, such as a voltage regulator, conditions the electrical power from the aircraft to a voltage level suitable for the components in control circuit 400. A driver 406, such as a current limiter, controls the amount of current supplied to the light sources 302. The light sources 302 may be operated at less than their rated power if desired, to increase the life of light sources 302. The light sources 302 may be electrically connected in series.

Figure 5:
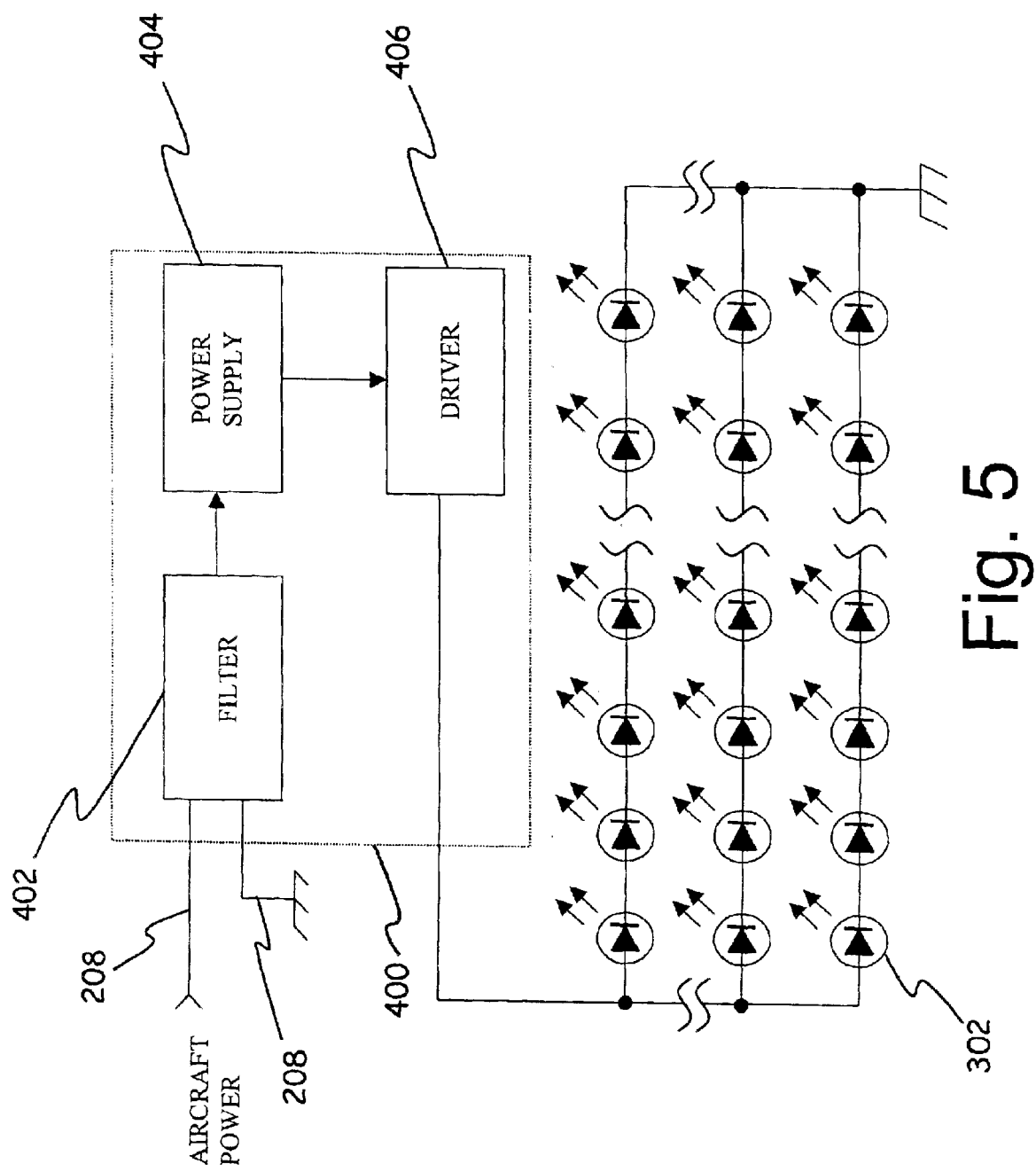
Figure 6:
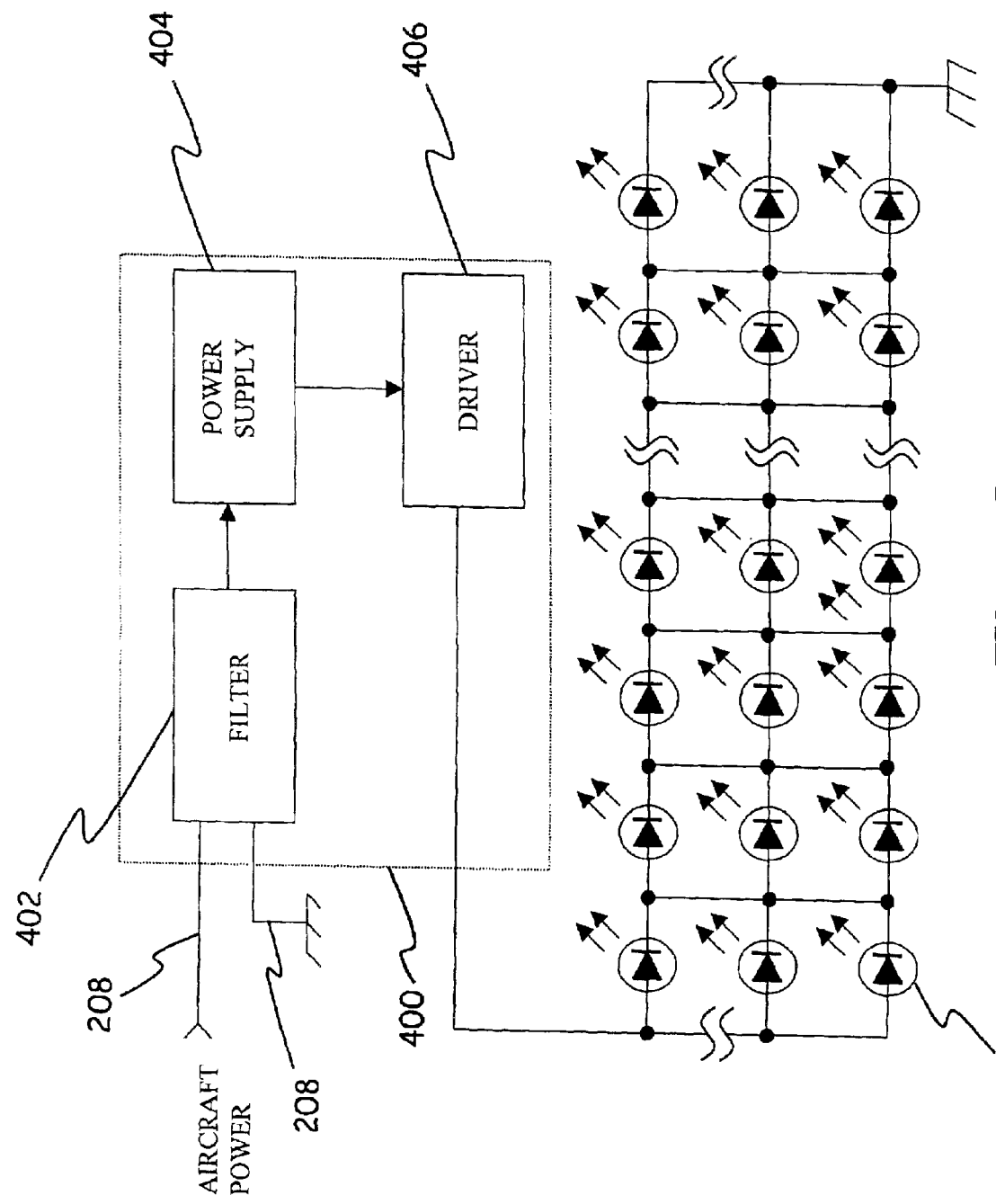

To improve reliability, rows of light sources 302 may be separately wired as shown in FIGS. 5 and 6 to prevent all of the light sources 302 from turning off if one light source 302 were to fail. Electrical power from the aircraft is supplied to control circuit 400 by electrical wiring 208. The high-voltage protection filter 402 isolates electrical noise between the aircraft and control circuit 400. The power supply 404, such as a voltage regulator, conditions the electrical power from the aircraft to a voltage level suitable for the components in control circuit 400. The driver 406, such as a current limiter, controls the amount of current supplied to the light sources 302. The light sources 302 may be operated at less than their rated power if desired, to increase the life of light sources 302. The light sources 302 are electrically connected in a series-parallel network.

Figure 7:
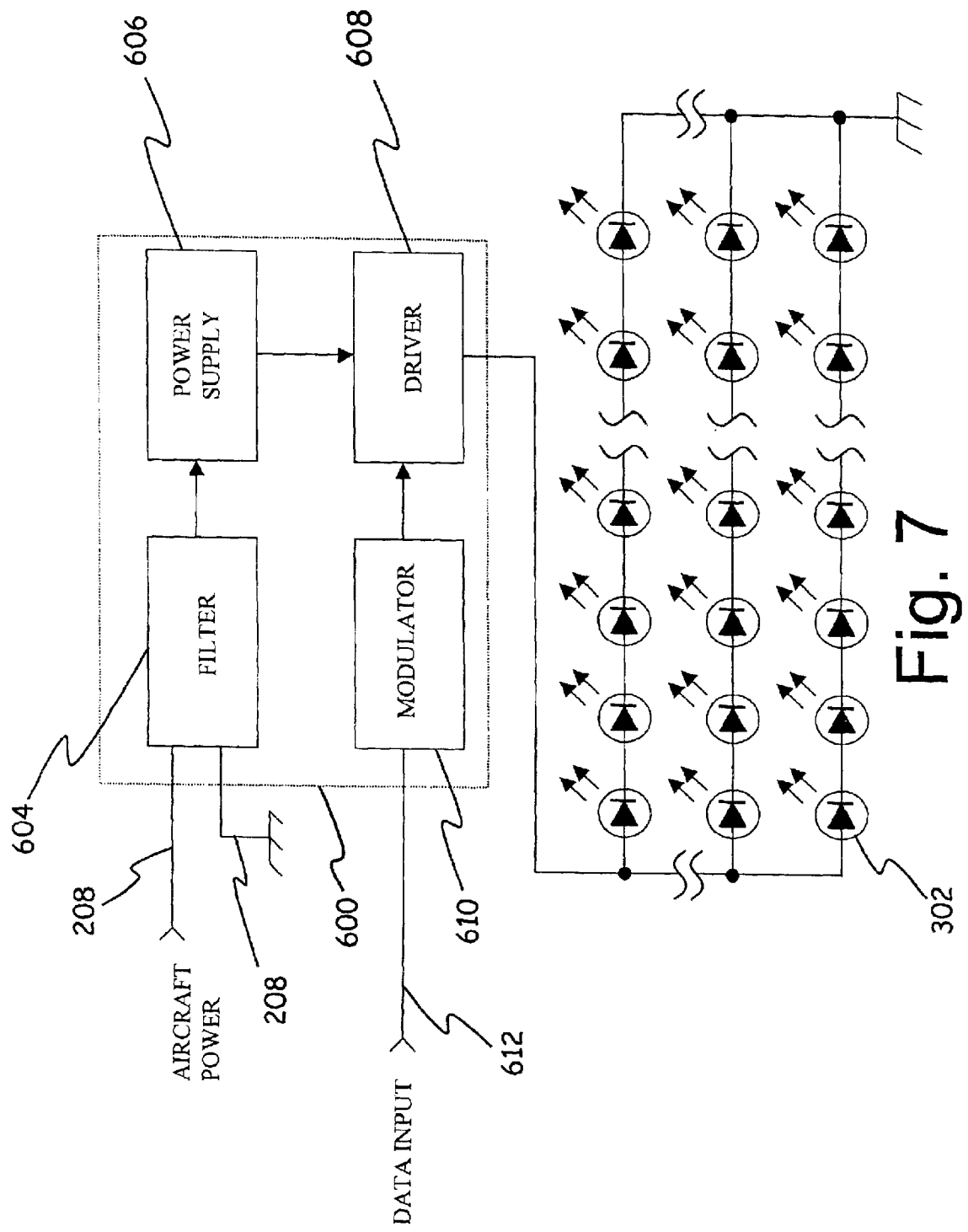
FIG. 7 is a block diagram of a means for modulating the position light.

FIG. 7 illustrates a preferred means for superimposing data on the light emitted by position light 200. Electrical power from the aircraft is supplied to a control circuit 600 by electrical wiring 208. Control circuit 600 may be located inside housing structure 202, or may be located remotely. A high-voltage protection filter 604 isolates electrical noise between the aircraft and control circuit 600. A power supply 606, such as a voltage regulator, conditions the power from the aircraft to a voltage level suitable for the components in control circuit 600. A driver 608, such as a current limiter, controls the amount of current supplied to the light sources 302. Data to be transmitted by position light 200 is supplied to a modulator 610, such as an amplitude modulator, by an input wire 612. Modulator 610 varies the amount of drive current supplied to the light sources 302 by driver 608. The light intensity of the light sources 302 varies in time with the data supplied to modulator 610, effecting the transmission of data on the light emitted by position light 200.

In operation, a red aircraft position light 102 is mounted to the port wing of an aircraft, a green position light 104 is mounted to the starboard wing, and a white tail position light 106 is mounted in a position such that its radiant output is directed toward the rear of the aircraft. As an alternative to tail position light 106, rearward facing lights 108 and 110 may be installed on the starboard and port wings respectively. The position lights are illuminated. Other aircraft operating in the vicinity of the lighted aircraft are alerted to the lighted aircraft's presence by the lights 102, 104, and 106 (or 108 and 110) and, by noting the observed color of the lights 102, 104, and 106 (or 108 and 110) and their relative movement, other aircraft can take appropriate evasive action to avoid a collision.

What is claimed is:

1. An aircraft position light, comprising:
   an aircraft position light housing structure, wherein said aircraft position light housing structure is formed to fit within a wing or a fuselage of an aircraft;
   at least one light source arranged inside said aircraft position light housing structure;
   a prism having an input face, an output face, and a transflective face to receive, distribute, and direct light emitted by said light source, said light source being located externally to said prism; and
   a lens through which emitted light passes, wherein said lens is engaged with the aircraft position light housing structure and light emitted by said light source is capable of passing through said lens.

2. The aircraft position light of claim 1, wherein a first portion of the light emitted from said light source undergoes total internal reflection at said transflective face of said prism and a second portion of the light emitted from said light source is transmitted through said transflective face, the combination of said first and second portions of light producing a lighting pattern with a sharp angular cutoff corresponding to the critical angle for said total internal reflection at said transflective face.

3. The aircraft position light of claim 1, further comprising an alignment guide for aligning said light source to direct said light source.

4. The aircraft position light of claim 3, wherein said alignment guide further includes means for carrying away heat generated by said light source.

5. An aircraft position light, comprising:
   an aircraft position light housing structure, wherein said aircraft position light housing structure is formed to fit within a wine or a fuselage of an aircraft;
   at least one light source arranged inside said aircraft position light housing structure;
   a prism having an input face, an output face, and a transflective face to receive, distribute, and direct light emitted by said light source, said light source being located externally to said prism;
   a lens through which emitted light passes, wherein said lens is engaged with the aircraft position light housing structure; and
   means for controlling the amount of electrical current applied to said light source.

6. The aircraft position light of claim 5, wherein said current control means is one of located inside said aircraft position light housing structure and located remotely from said aircraft position light housing structure.

7. The aircraft position light of claim 5, wherein said current control means includes means for modulating the intensity of said light source.

8. The aircraft position light of claim 1, wherein said light source emits one of a green, red, and white light.

9. The aircraft position light of claim 1, wherein said at least one light source comprises a plurality of light sources.

10. The aircraft position light of claim 9, wherein said light sources comprise a plurality of colors.

11. The aircraft position light of claim 9, wherein said light sources comprise a plurality of angular distributions of light.

12. The aircraft position light of claim 9, wherein said light sources are electrically connected in series.

13. The aircraft position light of claim 9, wherein said light sources are electrically connected in series-parallel.

14. An aircraft position light, comprising:
   an aircraft position light housing structure, wherein said aircraft position light housing structure is formed to fit within a wing or a fuselage of an aircraft;
   at least one light source arranged inside said aircraft position light housing structure; wherein said light source is solid state;
   a prism having an input face, an output face, and a transflective face to receive, distribute, and direct light emitted by said light source, said light source being located externally to said prism; and
   a lens through which emitted light passes, wherein said lens is engaged with the aircraft position light housing structure.

15. The aircraft position light of claim 1, further comprising an optical filter between said at least one light source and said input face of said prism to condition the light emitted by said light source.

16. The aircraft position light of claim 1, further comprising at least one diffuser between said at least one light source and said input face of said prism to further condition and distribute the light emitted by said light source.

17. The aircraft position light of claim 1, further comprising a second prism within said aircraft position light housing structure having an input face, an output face, and a transflective face to further shape and direct the light emitted by said light source.

18. The aircraft position light of claim 17, further including facets on the input face of said second prism.

19. The aircraft position light of claim 18, wherein said facets are one of flat and curved.

20. A position light, comprising:
a housing structure;
at least one light source arranged inside said housing structure;
a prism having an input face, an output face, and a transflective face to receive, distribute, and direct light emitted by said light source, said light source being located externally to said prism;
a lens through which emitted light passes, wherein said lens is engaged with the housing structure and light emitted by said light source is capable of passing through said lens; and
a second prism within said housing structure having an input face, an output face, and a transflective face to further shape and direct the light emitted by said light source, said second prism further including facets on said faces of said second prism.

21. The aircraft position light of claim 1, wherein said prism includes facets on the input face of said prism.

22. The aircraft position light of claim 21, wherein said facets are one of flat and curved.

23. A position light, comprising:
a housing structure;
at least one light source arranged inside said housing structure;
a prism having an input face, an output face, and a transflective face to receive, distribute, and direct light emitted by said light source, said light source being located externally to said prism; and
a lens through which emitted light passes, wherein said lens is engaged with the housing structure and light emitted by said light source is capable of passing through said lens, said prism further including facets on all faces of said prism.

24. A solid state aircraft position light, comprising:
an aircraft position light housing structure, wherein said aircraft position light housing structure is formed to fit within a wine or a fuselage of an aircraft;
a plurality of solid state light sources arranged inside said aircraft position light housing structure;
an alignment guide for aligning said solid state light sources to direct said light sources;
a prism having an input face, an output face, and a transflective face to receive, distribute, and direct light emitted by said solid state light sources, said light sources being located externally to said prism;
means for controlling the amount of electrical current applied to said solid state light sources; and
a lens through which emitted light from said light sources passes, wherein said lens is engaged with the aircraft position light housing structure.

25. A position light for use on an aircraft, comprising:
a housing structure;
a plurality of light sources arranged inside said housing structure, wherein said light sources are electrically connected in series-parallel;
an alignment guide aligning said light sources to direct said light sources;
means for carrying away heat generated by said light sources;
an optical filter for further conditioning the light emitted from said light sources;
a diffuser for further conditioning and distributing the light emitted from said light sources;
a first prism having an input face, an output face, and a transflective face to receive, distribute, and direct light emitted by said light sources, said light sources being located externally to said first prism, said first prism including facets on said input face;
a second prism having an input face, an output face, and a transflective face to further shape and direct the light emitted by said light sources, said second prism including facets on said input face;
means for controlling the amount of electrical current applied to said light sources; and
a lens through which emitted light passes, wherein said lens is engaged with the housing structure.

26. An aircraft position light fitted within a wing or fuselage, said aircraft position light comprising:
a prism having an input face, an output face, and a transflective face to receive, distribute, and direct light; and
at least one solid state light source wherein a first portion of the light emitted from said light source undergoes total internal reflection at said transflective face of said prism and a second portion of the light emitted from said light source is transmitted through said transflective face, the combination of said first and second portions of light producing a lighting pattern with a sharp angular cutoff corresponding to the critical angle for to said total internal reflection at said transflective face.

27. The aircraft position light fitted within the wing or the fuselage of claim 26, wherein the light emitted from said light source forms a continuum of incident angles of light on said transflective face such that some light exceeds the critical angle of total internal reflection for said prism, some light is at the critical angle of said is prism, and some light does not exceed the critical angle of said prism.

28. A process for providing aircraft position lighting for use on an aircraft, comprising:
providing an aircraft position light housing structure within a wing or a fuselage of an aircraft;
placing at said aircraft position light housing structure at least one light source;
applying electrical current to said at least one light source;
receiving, distributing, and directing light emitted from said light source by a prism having an input face, an output face, and a transflective face, said light sources being located externally to said prism; and
passing the emitted light through a lens, wherein said lens is engaged with the housing structure and light emitted by said light source is capable of passing through said lens after passing through said output face.

29. The process of claim 28, wherein a first portion of the light emitted from said light source undergoes total internal reflection at said transflective face of said prism and a second portion of the light emitted from said light source is transmitted through said transflective face, the combination of said first and second portions of light producing a lighting pattern with a sharp angular cutoff corresponding to the critical angle for said total internal reflection at said transflective face.

30. The process of claim 28, further comprising the steps of providing a second prism having an input face, an output face, and a transflective face and arranging said second prism at the transflective face of said prism to further shape and direct the light emitted by said light source.

31. The process of claim 28, further comprising the step of providing facets on the input face of said prism.

32. A process for providing lighting for use on an aircraft, comprising:
  providing a housing structure;
  placing at said housing structure at least one light source;
  applying electrical current to said at least one light source;
  receiving, distributing, and directing light emitted from said light source by a prism having an input face, an output face, and a transflective face, said light sources being located externally to said prism;
  including facets on all faces of said prism; and
  passing the emitted light through a lens, wherein said lens is engaged with the housing structure and light emitted by said light source is capable of passing through said lens after passing through said output face.

33. The process of claim 32, further comprising the step of shaping said facets to one of flat and curved shapes.

34. The process of claim 30, further comprising the step of providing facets on the input face of said second prism.

35. A process for providing lighting for use on an aircraft, comprising:
  providing a housing structure;
  placing at said housing structure at least one light source;
  applying electrical current to said at least one light source;
  receiving, distributing, and directing light emitted from said light source by a prism having an input face, an output face, and a transflective face, said light sources being located externally to said prism;
  providing a second prism having an input face, an output face, and a transflective face and arranging said second prism at the transflective face of said prism to further shape and direct the light emitted by said light source;
  including facets on all faces of said second prism; and
  passing the emitted light through a lens, wherein said lens is engaged with the housing structure and light emitted by said light source is capable of passing through said lens after passing through said output face.

36. The process of claim 28, further comprising the step of controlling said electrical current at one of from inside said aircraft position light housing structure and remotely from said aircraft position light housing structure.

37. A process for providing position lighting for use on an aircraft, comprising:
  providing an aircraft position light housing structure within a wing or a fuselage of an aircraft;
  placing at said aircraft position light housing structure a plurality of solid state light sources that are aligned to direct said light sources;
  applying and controlling electrical current to said solid state light sources;
  receiving, distributing, and directing light emitted from said solid state light sources by a prism having an input face, an output face, and a transflective face, said light sources being located externally to said prism; and
  passing the emitted light through a lens, wherein said lens is engaged with the aircraft position light housing structure.

38. A process for providing position lighting, comprising:
  providing a housing structure having an interior surface;
  placing at said housing structure a plurality of light sources that are aligned to direct said light sources, said light sources electrically connected in series-parallel;
  aligning said light sources to direct said light sources;
  carrying away heat generated by said light sources;
  optically filtering light from said light sources;
  diffusing light from said light sources;
  receiving, distributing, and directing light emitted from said light sources by a first prism having a faceted input face, an output face, and a transflective face, said light sources being located externally to said first prism;
  shaping and directing the light emitted by said light sources by means of a second prism disposed at the transflective face of said first prism and having a faceted input face, an output face, and a transflective face;
  applying and controlling electrical current to said light sources; and
  passing the emitted light through a lens, wherein said lens is engaged with the housing structure.

39. A process for providing aircraft position lighting for use on an aircraft, comprising:
  providing at least one solid state light source within a wing or a fuselage of an aircraft;
  applying electrical current to said light sources; and
  receiving, distributing, and directing light emitted from said light source by a prism having an input face, an output face, and a transflective face, wherein a first portion of the light emitted from said light source undergoes total internal reflection at said transflective face of said prism and a second portion of the light emitted from said light source is transmitted through said transflective face, the combination of said first and second portions of light producing a lighting pattern with a sharp angular cutoff corresponding to the critical angle for said total internal reflection at said transflective face.

40. The process of claim 39, wherein the light emitted from said light source forms a continuum of incident angles of light on said transflective face such that some light exceeds the critical angle of total internal reflection for said prism, some light is at the critical angle of said prism, and some light does not exceed the critical angle of said prism.

* * * * *